June 30, 1964 G. S. WING 3,138,987
FASTENERS
Filed Aug. 7, 1961 5 Sheets-Sheet 1
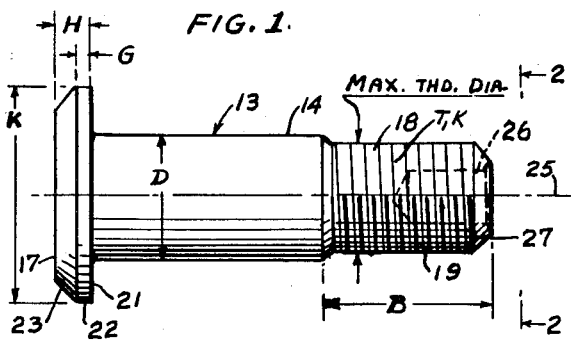
FIG. 1.
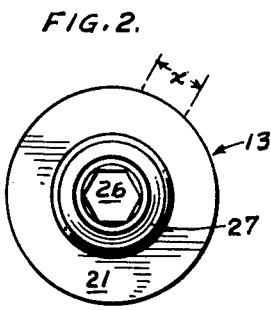
FIG. 2.
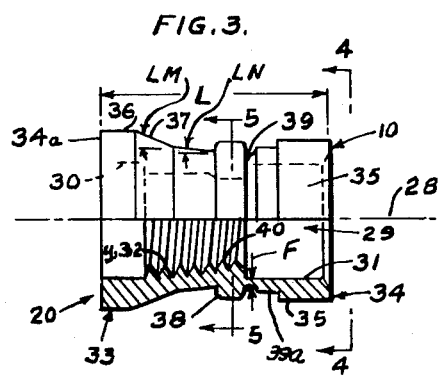
FIG. 3.
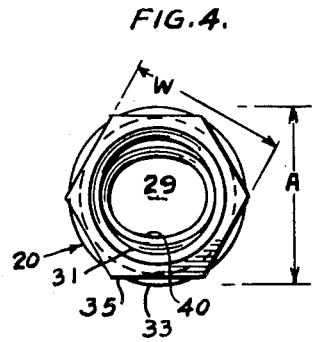
FIG. 4.
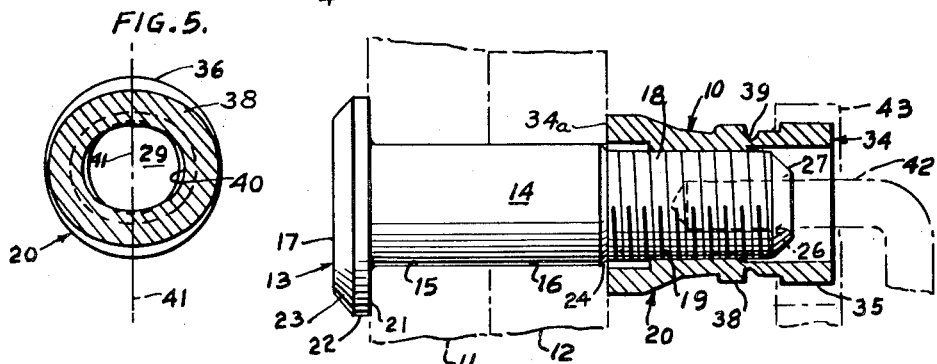
FIG. 5. FIG. 6.
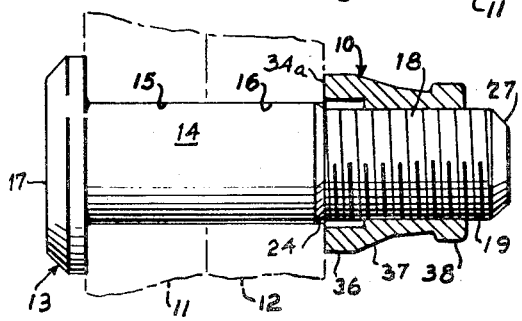
FIG. 7.
INVENTOR.
GEORGE S. WING
BY
ATTORNEYS June 30, 1964   G. S. WING   3,138,987
FASTENERS Filed Aug. 7, 1961   5 Sheets-Sheet 2

INVENTOR.
GEORGE S. WING
BY
ATTORNEYS

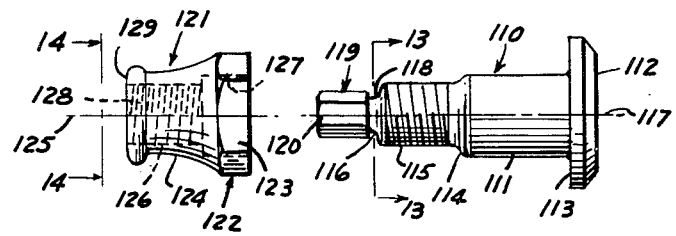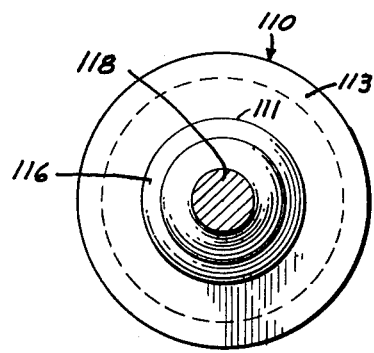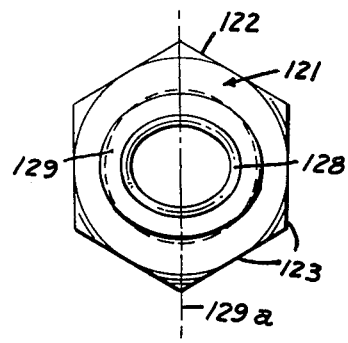

June 30, 1964  G. S. WING  3,138,987
FASTENERS
Filed Aug. 7, 1961                                         5 Sheets-Sheet 4
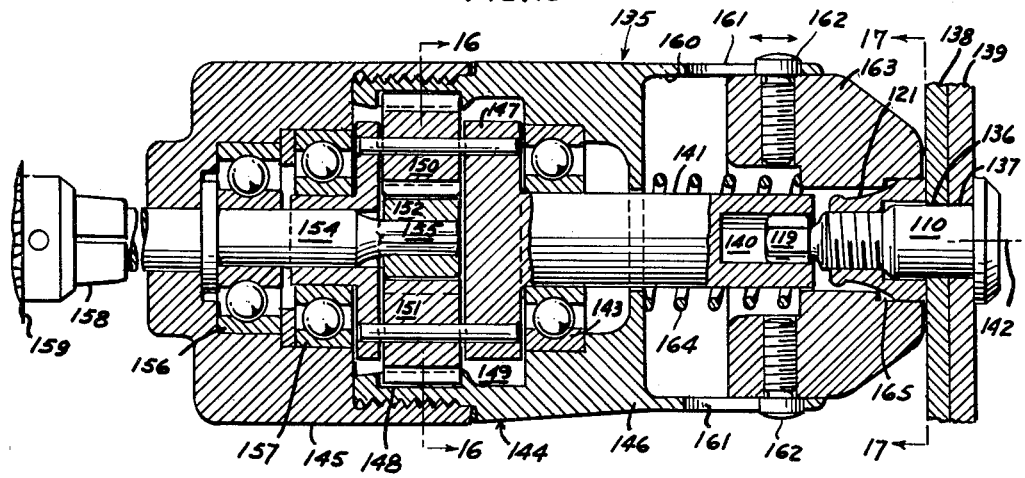
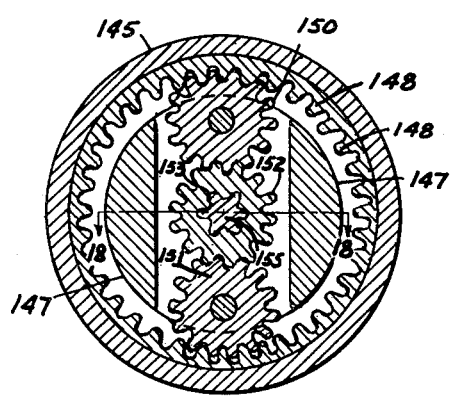
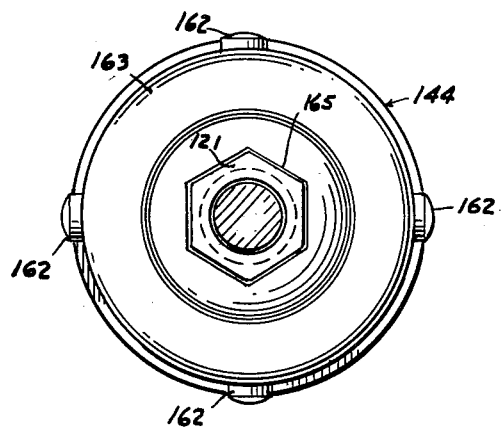
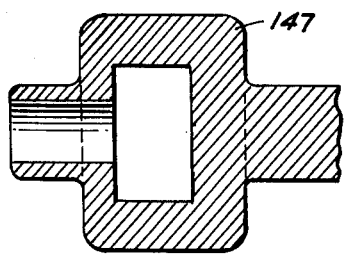
INVENTOR.
GEORGE S. WING
BY
ATTORNEYS.

June 30, 1964   G. S. WING   3,138,987
FASTENERS
Filed Aug. 7, 1961   5 Sheets-Sheet 5
FIG.19
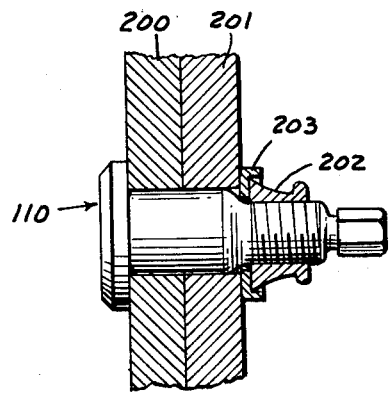
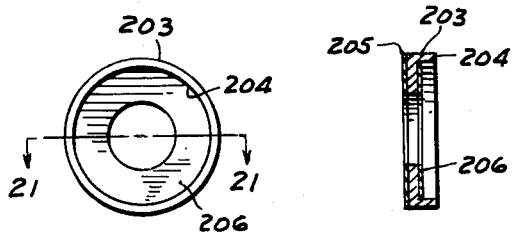
FIG.20   FIG.21.
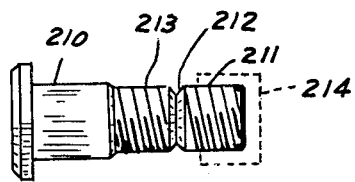
FIG.22
INVENTOR.
GEORGE S. WING
By
ATTORNEYS.

United States Patent Office 3,138,987
Patented June 30, 1964

3,138,987
FASTENERS
George S. Wing, Palos Verdes Estates, Calif., assignor to Hi-Shear Corporation, Torrance, Calif., a corporation of California
Filed Aug. 7, 1961, Ser. No. 129,699
10 Claims. (Cl. 85—61)

This invention relates to fasteners, and in particular to a threaded fastener capable of being torque controlled.

An object of this invention is to provide a threaded fastener which is provided with means for indicating whether a predetermined torque has been applied thereto. A related object is to limit the torque which can be applied to some predetermined value.

A further object is to provide means for retaining the fastener in its torqued condition.

In one embodiment of this invention, a headed pin which is threaded to receive a threaded collar, is provided with a wrench-engaging means. The collar has a wrench-engaging means and has threads so that the collar can be threaded onto the pin to hold bodies between the collar and the pin's head when the pin is passed through holes in the said body. By applying opposing torques to wrenches engages the pin and the collar, the fastener can be tightened. According to a preferred feature, a circumferential groove is formed in the collar between the wrench-engaging surfaces and the end of the collar which bears against the bodies being joined. This groove reduces the wall thickness of the collar to a calculated dimension which will shear at a given torque, thereby indicating that a predetermined torque has been applied, and also limiting the torque which can be applied to some predetermined value.

A preferred but optional feature resides in an enlarged exterior circumferential bead, and a distortion of the hole within the collar so as to give the hole a diametrical dimension less than the diameter of the threads on the pin. This hole distortion and bead together provide a retaining section which grips the pin and maintain the fastener in its torqued condition. This bead also provides a "crack stopper" which prevents any roughness of the sheared end from developing into a crack due to stress concentrations.

According to another embodiment of this invention a fastener comprising a threaded and headed pin has applied thereto a threaded collar, so that the collar can be torqued on to the pin to clamp bodies between the head and the collar. The pin is provided with wrench-engaging means. According to a preferred feature of this embodiment, there is a groove in the pin which reduces the cross-section of the pin at its axial location to the smallest cross-section of the entire pin between the head and the wrench-engaging means. When torque above a value determined by the shear strength of the aforesaid smallest cross-section is applied between the collar and the aforesaid wrench engaging surfaces, the section of the pin having the wrench-engaging surfaces breaks off at the aforesaid groove. The collar is thereby tightened onto the pin at a predetermined torque.

Another feature of this invention resides in means for decreasing variations in the bearing forces between the work and the collar. According to this feature, a lubricated washer is placed between the work and collar so as to result in a predictable reaction force, regardless of the finish of the work; and this reaction force will be substantially the same in all such fasteners of a given size and character.

The above and other features of this invention will be fully understood from the following detailed description and the accompanying drawings, of which:

FIG. 1 is an elevation of a pin according to the invention;

FIG. 2 is an end view taken at line 2—2 of FIG. 1;

FIG. 3 is an elevation of a collar according to this invention;

FIG. 4 is an end view taken at line 4—4 of FIG. 3;

FIG. 5 is a cross-section taken at line 5—5 of FIG. 3;

FIG. 6 is a side view, partly in cross-section, of a fastener according to this invention in the process of being tightened;

FIG. 7 is a side view, partly in cross-section, showing the fastener of FIG. 6 in its finally-tightened condition;

FIGS. 11 and 12 are side elevations of the pin and collar portions, respectively, of another form of fastener according to this invention;

FIG. 13 is a cross-section taken at line 13—13 of FIG. 11;

FIG. 14 is an end view taken at line 14—14 of FIG. 12;

FIG. 15 is a side elevation, partly in cross-section, of a tool according to this invention for setting the fastener of FIGS. 11 and 12;

FIG. 16 is a cross-section taken at line 16—16 of FIG. 15;

FIG. 17 is a cross-section taken at line 17—17 of FIG. 15;

FIG. 18 is a fragmentary cross-section taken at line 18—18 of FIG. 16;

FIG. 19 is a side elevation partly in cross-section of a fastener according to still another embodiment of the invention;

FIG. 20 is a plan view of part of the fastener of FIG. 19;

FIG. 21 is a cross-section taken at line 21—21 of FIG. 20; and

FIG. 22 is a side view of an optional type of pin for the fastener of this invention.

Figure 8:
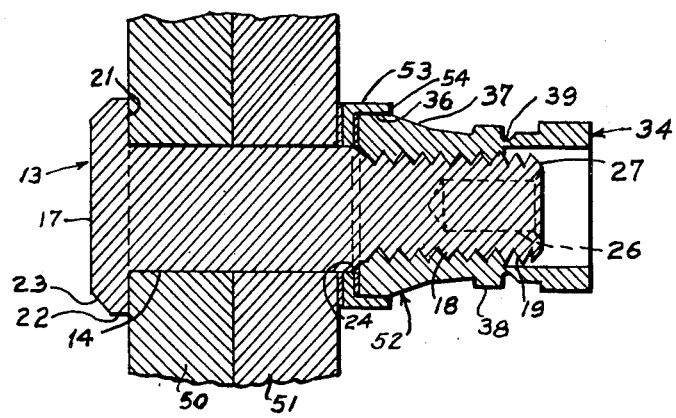
FIG. 8 is a cross-section of another fastener according to this invention.

A fastener 10 according to this invention, is shown in FIG. 6, about to be tightened so as to join a pair of bodies 11, 12. This fastener comprises a pin 13 having a shank 14 which passes through registering holes 15, 16 in the bodies 11, 12, respectively. A head 17 on one end of the pin abuts against body 11 and a threaded end 18 having external circumferential threads 19 thereon projects beyond the body 12. When the fastener is installed, these threads are engaged by a collar 20.

As will be seen from an examination of FIGS. 1 and 2, the head of the pin may conveniently have a body-engaging surface 21 in the form of a flat annulus, a cylindrical section 22 adjacent the surface 21 and a frusto-conical chamfered section 23 adjacent the cylindrical section. It will be understood that other types of heads can be provided on this type of pin, such as countersunk or flat-head if desired, this type of head being given merely as one example.

The major diameter of the thread is relieved so that the maximum thread diameter is somewhat less than the diameter of the shank. The pin has a longitudinal axis 25. In the threaded end 18 of the pin there is sunk a wrench-receiving recess 26, on the said axis. This recess is preferably hexagonal for receiving an Allen-type wrench to hold the pin against turning. It can conveniently be formed by a broaching process. For convenience in assembling the fastener, a chamfer 27 is formed at the threaded end of the pin.

A collar 20 according to this invention is shown in detail in FIG. 3. This collar has a longitudinal axis 28 and a pin-receiving hole 29 located on said axis. Counterbores 30, 31, are provided at each end of the hole 29, and threads 32 are formed in the inner wall of the hole 29 between the two counterbores. This inner wall thereby comprises the two counterbores, and the threads 32. The diameters of the counterbores are both larger than the maximum diameter of the threads 32.

The nut has a bearing end 33 and a wrench-receiving end 34. The bearing end 33 has a flat annular surface 34a for engagement with a body, such as body 12, when the fastener is tightened down. The wrench-receiving end has a plurality of wrench-engaging surfaces 35, which can receive a wrench such as a socket 43 or a crescent for turning the collar on to the pin.

Immediately adjacent to the bearing surface 34a, there is a short cylindrical surface 36 which is joined by a taper 37, which taper reduces in diameter until it reaches a position contiguous to a bead 38. This bead is an enlarged external circumferential bead around and integral with the outer wall of the nut. The taper is provided for the purpose of reducing the weight of the collar where so much material is unnecessary. Taper angles M and N may conveniently be 15° and 5°, respectively, but it will be understood that these angles may be made somewhat different. Immediately contiguous to the bead there is a groove 39 in the outer wall of the collar. The bead is thus disposed between the groove 39 and the bearing end of the collar. The groove is disposed between the bead and the wrench-engaging surfaces.

As can be seen from the drawings, particularly in FIG. 3, the thickness of the collar as measured radially between the inner wall of the hole 29 and the outer wall of the collar (said outer wall comprising cylindrical surface 36, taper 37, bead 38, groove 39 and wrench-engaging surfaces 35) is the least at the groove (dimension F in FIG. 3), so that when torsional forces are applied to said nut, the section at the groove will be the first to shear. It will also be observed that the interior threads 32 in the collar end approximately axially adjacent the groove and that the counterbore 31 also ends approximately axially at the groove.

In order to provide for retention of the collar on the pin after setting, the collar, which may have been manufactured on an automatic screw machine, and thereby turned out perfectly round, except for the wrench-engaging surfaces, may conveniently be distorted out-of-round by the application of force on diametrically opposed points on surface 38. A preferred form of this distortion is an ellipse such as is shown in FIG. 5. FIG. 5 shows the collar with its section at the head distorted so that an ellipse 40 is formed having a minor axis 41 which comprises at least one diametrical dimension of the inner wall which is less than the diameter of the threads on the pin. The two ends of the nut such as the cylindrical section 36 and the hexagonal section having the wrench-engaging surface 35, will conveniently retain their circular and hexagonal sections, respectively, and for this purpose the wall thicknesses at these places are greater than the wall thickness at the portion adjacent the bead. Therefore the central portion of the collar can be deformed without substantially distorting the other two ends. The threads 19 of the pin may therefore be easily started in the substantially round portions of the threads 32 nearer the bearing end.

A cylindrical section 39a is provided just between the groove and the wrench-engaging surfaces. This cylindrical section 39a is of lesser diameter than the hex dimension A. For a 9/16" hex dimension A, the diameter of 39a may be .238±.002 inch, the diameter of counterbore 31 being .197±.001 inch. The diameter of the bottom of groove 39 may be .214±.001 inch. The reduced diameter of 39a has been found desirable to keep the nut from failing at groove 39 when force is applied to distort surface 38, and consequently the thread portion out of round. This reduced section takes up some of the distortion, whereas the heavier hexagonal portion would not distort easily. If it should distort, it would not fit the wrench nicely.

Figure 9:
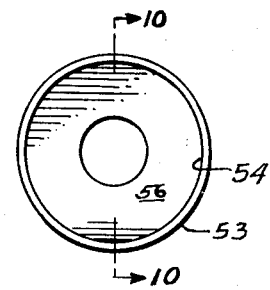
FIG. 9 is a plan view of a part of the fastener of FIG. 8.
Figure 10:
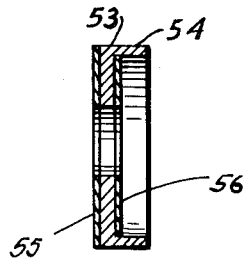
FIG. 10 is a cross-section taken at line 10—10 of FIG. 9.

In FIGS. 8–10, there is shown another embodiment of the invention. One problem which sometimes arises in torquing collars onto pins resides in the variability of the reaction force between the workpiece and the collar, or between the collar and whatever other element it may abut, such as a washer. This reaction force may vary for a given nut from installation to installation, depending on surface finish, cleanliness, and other factors which influence friction and are difficult to control.

Because of the variation in the reaction force due to bearing of the collar with the workpiece which it is tightened against, the torque on the collar might be indicated properly, but the pre-stress on the bolt might at that time be wrong. An object of this invention is to provide proper and highly uniform pre-stress resulting from a uniform tensile preload as a consequence of a known torque resulting from controlled physical properties at the torsional shear off area plus a constant coefficient of friction between the collar and the workpiece which the nut abuts. If reaction force is thus kept predictable then a correct preload indication can be obtained, because the two variables (torque and reaction force) are then under control.

The above problems are solved in this invention by providing a layer of substantially dry lubricant between the collar and workpiece which the collar abuts. The presently-preferred type of lubricant is a polar wax compound, which is substantially dry. One example of this type of compound is sold by S. C. Johnson & Sons, Inc., located at Racine, Wisconsin, under the name #153 Wax Lubricant "Tube Draw." This lubricant is provided in an evaporable liquid base. The base evaporates before the lubricant is used as described below, leaving the dry wax. A polarized lubricant has been found to be most useful inasmuch as it is very difficult to remove from a surface. Once the above liquid compound has dried, the wax remaining on the treated surface can be removed only by using a strong solvent. There are other suitable dry lubricants that may be baked on or applied electrolytically, or chemical lubricants such as molybdenum disulphide, but the polar wax is preferable by reason of cost and convenience.

FIGS. 8–10 show a means for advantageously utilizing such a lubricant. A pair of plates 50, 51 to be joined together are shown pierced by a pin 13 such as the pin shown in FIG. 1. A collar 52 is threaded onto the protruding end of the pin. Collar 52 is identical in all details to collar 20, except that it may, if desired, be made as shown without counterbore 30.

A substantially incompressible metal washer 53, which can be made in various thicknesses to provide the desired shim size, is spaced between the work and the collar. The washer has an annular centering flange 54 at its outer periphery which may be used to aid in making a pre-assembly of its collar and washer.

Layers 55, 56 of lubricant of the type described above, are applied to each of the opposite flat sides of the washer. The thickness of the layer is shown relatively larger than it actually is in comparison to the washer thickness for purposes of illustration. It will be recognized that this layer need be little more than a film in order to do its work. Layer 55 is optional.

The installation of the fastener of FIGS. 1–7 will now be described. The bodies to be joined such as bodies 11 and 12 are first placed with their holes 16 and 17 in registration, and the pin 13 is then passed therethrough so that its head 17 bears against one of the bodies. Thereafter, the collar 20 is threaded on to the threads of the pin, and is ready to be tightened down. For this purpose an Allen-head wrench 42 (see FIG. 6) may be inserted to the wrench receiving recess 26 of the pin so as to hold the pin against rotation. A wrench such as a socket 43 can be placed over the hexagonal wrench engaging surfaces 35. Thereafter, either or both of the wrenches can be counter-rotated, and the nut can be tightened onto the bolt. A convenient mechanical wrench including both of these wrench elements is shown in my United States Letters Patent 2,882,773 issued April 21, 1959 for "Bolt Holding Wrench."

Until a sufficient torque is applied that the shear strength of the collar at the groove section is exceeded, the collar will simply be tightened down on to the pin. However, after a predetermined torque is reached, the shear strength of the section at the groove 39 will be exceeded, and the hexagonal section will be sheared off, leaving the portion of the fastener to the left of the groove in FIG. 7 tightened on to the bolt with a predetermined and known torque.

In applying this collar to this pin, the pin has tended to round out the collar in opposition to the restoring forces tending to retain the collar in its distorted oval shape. These restoring forces cause the collar to clamp tightly on to the pin and retain it against being shaken free. The device is therefore held in its torqued position in a substantially shake-free condition. This retention is materially aided by the bead 38 which strengthens the end of the collar and gives increased restoring forces where they are most needed. In addition this bead resists any tendency of the collar to crack axially when the hexagonal section shears off in setting.

Counterbore 30 enables a wide range of grip sizes of pins to be used with the same collar, and the same thickness of bodies, because the counterbore section does not have to engage the pin, and can simply move along the shank 14 of the pin. A pin of a given grip length can thereby be used on different body thicknesses with this nut. Therefore, this fastener has a substantial grip range, and fewer individual fastener sizes need to be stocked. Counterbore 31 enables the sheared-off hexagonal portion of the collar to fall free, inasmuch as this section does not thread onto the pin.

Suitable dimensions for a fastener of these types are given below, the reference numerals and letters relating to those shown in the drawings. In collar 52, the counterbore 30 may be omitted. The pin 13 may conveniently be made of MST 6AL–4V titanium, heat-treated to 95,000 p.s.i. shear, while the collar may conveniently be 2024 aluminum alloy, precipitation hardened to 41,000 p.s.i. shear. Torques at which the hexagonal sections shear off are also given in the table below.

*Table*

PIN 13

| | K | B | D | TD | G | H | T.19 | X, inch Hex. |
|---|---|---|---|---|---|---|---|---|
| 3/16 | .315 .295 | .300 | .1895 .1890 | .1865 | .025 | .055 .045 | 10-32 NF-3A | 9/64 |
| 1/4 | .412 .387 | .370 | .2495 .2490 | .2465 | .030 | .069 .059 | 1/4" 28 UNF-3A | 3/32 |
| 5/16 | .505 .475 | .425 | .3120 .3115 | .3085 | .035 | .078 .068 | 5/16" 24 UNF-3A | 3/32 |
| 3/8 | .600 .565 | .490 | .3745 .3740 | .3705 | .040 | .088 .078 | 3/8" 24 UNF-3A | 1/8 |

COLLAR 20

| | A | L | Y-32 | Y, inch Hex. | F, inches | Torque off, inch-lbs. |
|---|---|---|---|---|---|---|
| 3/16 | .300 .002 | .442 .005 | 10-32 NF-3B | 5/10 | .0085 | |
| 1/4 | .403 .397 | .467 .457 | 1/4" 28 UNF-3B | 11/32 | .015 | 70-85 |
| 5/16 | .483 .477 | .573 .563 | 5/16" 24 UNF-3B | 7/16 | .015 | |
| 3/8 | .563 | .593 | 3/8" 24 UNF-3B | 1/2 | .015 | |

It is to be understood that the pin could be held against rotation at its headed end by means such as an Allen-head wrench, or even an ordinary slot and screw driver, the examples shown being the preferred embodiments of the invention.

The provision of the lubricated washer, which may have its lubrication on one or both of its flat sides, provides, in addition to torque-control and torque-limit means, an additional assurance that reaction forces due to bearing of the collar against another surface are constant and predictable.

FIGS. 11 and 12 show the two parts of another embodiment of a fastener which may be used in the practice of this invention. In FIG. 11 there is shown a pin 110 having a shank 111 with a head 112 at one end thereof. The head is provided with a flat annular shoulder 113 for bearing against a body, which may be one of two or more bodies to be joined by the fastener. It will be understood that any other appropriate bearing surfaces such as a countersink surface could also be provided in place of the flat shoulder 113. At the other end of the shank from the head 112 there is a step 114 which reduces the diameter of the pin so that a section having external circumferential threads 115 is of smaller diameter than the shank portion 111. On the other side of the threads 115 from the head 112 there is a groove 116 which reduces the diameter of the pin at this location along the central axis 117 of the pin to its smallest value between the two ends. The smallest cross-section area 118 at this axial location is more particularly shown in FIG. 13.

With further reference to FIG. 11, a wrench-engaging section 119 is provided on the other side of the groove from the headed end of the pin. Wrench-engaging surfaces 120 are provided on said section 119. The wrench engaging surfaces may form a hexagonal prism as shown for engagement with a socket if desired, although it will be understood that other configurations, as well as slotted means and recesses could as well have been provided in the wrench-engaging section 119.

In FIG. 12 there is shown a collar 121 which is particularly suited for use with the pin 110. This collar has an enlarged wrench-engaging section 122 having exterior wrench-engaging surfaces 123. As shown these surfaces may conveniently form a hexagonal prism for reception of a socket. It will be understood that any other appropriate external wrench-engaging type of surface could have been provided in place of those shown. The outer wall of the collar adjacent the wrench-engaging surface 122 has a curved surface 124 which diminishes in diameter as it extends away from the wrench-engaging section. This is for the purpose of reducing the weight of the collar by removing unnecessary metal.

The collar has a central axis 125 and an axially extending hole 126 therethrough. This hole is provided with a counterbore 127 at the end having the wrench-engaging surfaces 123, and has internal threads 128 extending away from the counter-bore. The counterbore's diameter is greater than the greatest thread-depth diameter.

The end 128 of the collar which is farthest removed from the wrench-engaging section is provided with an enlarged bead 128a for strengthening this end. End 129 can conveniently be put into a V block or some other compression means and pressed out of round as more particularly shown in FIG. 14. A convenient shape for this end 129 is an ellipse. When the collar is round, the threads of the collar turn onto the threads of the pin. When the end 129 of the collar is made elliptical, the ellipse has a minor axis 129a which is less than the diameter of threads 115.

When the collar is threaded onto the pin, the threads 115 round out the elliptical end 129. The collar, having been initially deformed to an elliptical shape, exerts a restoring action which tends to hold the collar onto the pin after the fastener is set. The counter-bore 127 has a larger diameter than shank 111, and can therefore pass along the shank. This permits a pin of a single grip length (shank length) to be used on a wide range of material thicknesses.

In FIG. 15 there is shown a tool 135 which is particularly suited for setting the fasteners of this invention. In this figure, the fastener of FIGS. 11 and 12, which comprises a pin 110 and a collar 121, is shown with the pin inserted through registering holes 136, 137 in plates 138, 139 respectively, which plates are to be joined by the fastener. The collar is first threaded onto the pin. The wrench-engaging section 119 of the pin is then inserted into a similarly shaped recess having fastener-engaging surfaces 140 in the shape of a hexagonal prism in the end of a wrench 141. The wrench is concentric around a central axis of rotation 142 of the tool. The wrench is rotatably journaled in a bearing 143 which bearing is mounted in a cage 144. The cage may conveniently be made of two cage portions 145, 146 which are joined together to form a single unit.

The wrench is attached to, and is also preferably integral with, a spider 147. The cage has an internal ring gear 148 in the inner wall of a cavity 149. This ring gear surrounds the spider and engages a pair of planetary gears 150, 151. These planetary gears are journaled to the spider.

A central drive gear 152 is placed within the spider on the central axis 142 of the tool and it engages the two planetary gears. It will be observed that the planetary gears are disposed to the side of the central axis 142, in engagement with both the central drive gear 152 and with the ring gear 148. The central drive gear has key slot 153 therein (see FIG. 16) into which a drive shaft 154 is inserted. The drive shaft has a tongue section 155 which enters and engages the aforesaid slot 153. The drive shaft 154 is rotatably journaled in a thrust bearing 156 that is mounted to the cage, and the spider is further supported by another bearing 157 also mounted to the cage.

The drive shaft 154 projects from the cage, where it may be held by a chuck 158 mounted to a drill motor 159 or some other motive means for turning the drive shaft.

The cage has a tubular portion 160 projecting to the right in FIG. 15 which surrounds and is concentric with the wrench. Four slots 161 in this tubular portion receive studs 162. These studs protrude from a socket 163 and are slidable in the slots 61, whereby the socket itself is slidable within the tubular portion. A coil spring 164 is placed within the aforesaid tubular portion in opposition between the cage and the socket so as to presse the socket to the right as shown in FIG. 15.

The socket is provided with a collar receiving recess 165 having surfaces suitable for engagement with the wrench-engaging section 122 of the collar.

The wrench, socket, cage, drive shaft and drive gear are all concentric on axis 142.

In FIGS. 19–21 there is shown another embodiment of the invention. One problem which sometimes arises in torquing collars on to pins to a desired torque resides in the variability of the reaction force between the workpiece and the collar, or between the collar or whatever other element it may abut, such as a washer, for example. This reaction force may vary from installation to installation, depending on surface finish, cleanliness, and other factors which are difficult to control.

Because of the variation in the reaction force due to bearing of the collar with the workpiece which it is tightened against, the torque on the collar might be indicated properly, but the pre-stress on the bolt might at that time be wrong. An object of this invention is to provide proper and highly uniform pre-stress resulting from a uniform tensile preload as a consequence of a known torque resulting from controlled physical properties at the torsional shear off area plus a constant co-efficient of friction between the collar and the workpiece which the nut abuts. If reaction force is thus kept predictable then a correct preload indication can be obtained, because the two variable (torque and reaction force) are then under control.

The above problems are solved in this invention by providing a layer of substantially dry lubricant between the collar and workpiece which the collar abuts. As has been explained herein above, the presently-preferred type of lubricant is polar wax compound, which is substantially dry. One example of this type of compound is sold by S. C. Johnson & Son, Inc., located at Racine, Wisconsin, under the name #153 Wax Lubricant "Tube Draw." This lubricant is provided in an evaporable liquid base. The base evaporates before the lubricant is used as described below, leaving the dry wax. A polarized lubricant has been found to be most useful inasmuch as it is very difficult to remove from a surface. Once the above liquid compound has dried, the wax remaining on the treated surface can be removed only by using a strong solvent. There are other suitable dry lubricants that may be baked on or applied electrolytically, or chemical lubricants such as molybdenum disulphide, but the polar wax is preferable by reason of cost and convenience.

FIGS. 19–21 show a means for advantageously utilizing such a lubricant. A pair of plates 200, 201 to be joined together are shown pierced by a pin 110 such as the pin shown in FIG. 11. A collar 202 is threaded on to the protruding end of the pin. Collar 202 is identical in all details to collar 121, except that it may, if desired, be made as shown without a counter-bore 127.

A washer 203, which can be made in various thicknesses to provide any desired shim size, is placed between the work and the collar. The washer has an annular centered flange 204 at its outer periphery which may be used to aid in making a preassembly of the collar and washer.

Layers 205, 206 of lubricant of the type described above are applied to each of the opposite flat sides of the washer. The thickness of the layers is shown relatively larger than it actually is in comparison to the washer thickness for purposes of illustration. It will be recognized that this layer need be little more than a film in order to do its work. Layer 205 is optional.

FIG. 22 shows a pin 210 having a head and shank portion like pin 110 of FIG. 11. However, instead of being provided with a prismatic wrench-engaging section, the wrench-engaging section of pin 210 is merely threaded as at 211. A groove 212 provides a shear section of least cross-section area. A collar can be threaded onto threads 213 on the opposite side of the groove from the wrench-engaging section. A wrench 214 is shown in phantom line threaded onto the wrench-engaging surfaces (threads 211), and bottomed on the end of the pin. This pin will shear at groove 212 in the same manner as pin 110 shears at groove 116. It will be recognized that pin 210 can be made by cutting threads 211 and 213 as a single continuous thread, and then machining groove 212. This results in an easily manufactured pin.

The operation of the fastener of FIGS. 11 and 12, and of the tool for setting it, will now be described.

Initially, the holes 136 and 137 in bodies 138 and 139 to be joined are placed in registration in the manner shown in FIG. 15. The pin is passed through the registering holes with the head 112 pressing against one of said bodies and the threads 115 on the pin projecting out of the hole on the other of said bodies. The collar is then loosely threaded on to the pin. Thereafter the socket 163 is placed in engagement with the wrench-engaging section 122 on the collar, and the wrench-engaging section 119 of the pin is inserted in the recess 140 in the wrench. Power is then applied to the motor and as will be evident from an examination of the drawings the wrench and the cage (and therefore the socket) will counter-rotate. It is immaterial in this device whether the wrench or the socket actually rotates, so long as one of them does. In this device, it is possible for either to stand still while the other one rotates.

When the tool is first operated, there is a tendency for both the wrench and the socket to turn. However, there will ordinarily soon be some resistance to the pin's turning in the hole and the wrench holds nearly still, while the cage and the socket turn. This operation turns the collar on to the pin until the collar makes a firm engagement with the body adjacent to it. It will be seen that when the collar moves along the pin, the socket can recede into the tubular portion 160, while the end of the pin can advance into the recess 140 in the wrench.

After the collar has become seated against one of the bodies, the socket will cease to turn and the load imposed by rotation of the drive shaft, will be exerted mostly on the wrench. The wrench continues to exert this torque, tending to tighten the collar and the pin so as to compress the bodies together until a torque is exerted which is in excess of the shear strength of the reduced section 180 of the pin at groove 160. The wrench-engaging section of the pin then shears off. After the wrench-engaging portions of the pin is sheared off, the wrench simply spins free, and the socket can be pulled off leaving the fastener in its finally set condition.

As the collar is tightened down on to the pin, the elliptical end of the collar is rounded out by the pin, but the restoring forces within the collar which result from the "redistortion" of the collar to a round shape exert a retaining force on the pin tending to hold the collar on the pin.

The fastener of FIGS. 19–21 is set in the same manner as the fastener in FIGS. 11 and 12, and may conveniently be set by the tool of FIG. 15. The distinction between the fastener of FIGS. 19–21 from the fastener of FIGS. 11 and 12 is that the layers of lubricant act as a friction or force-reducing agent between abutting metallic surfaces, particularly between the collar and the work. Perhaps as important is the fact that whatever this force may be, it is predictably substantially constant inasmuch as it is controlled by the presence of the lubricant and does not greatly depend upon the surface finish of the work.

It will be recognized that this washer may have its lubrication on one or both of its flat sides. It provides an assurance that the reaction forces due to the bearing of the collar against the ultimate bearing surface, will be constant and predictable. It will further be recognized that even were the surface of the washer immediately adjacent the collar not lubricated, the presence of lubrication on the side adjacent to the work would still provide most, if not all, of the features of the invention, inasmuch as there would be a lubricated slippage at this point which would, of course, be transmitted to the collar when it is being set.

It will be observed that the fastener will have been set by a predetermined torque which is determined by the shear strength at the reduced cross-section 180. Therefore given accurate manufacture of the pin, the shearing off of the wrench-engaging section assures the user of two facts. First, that a torque of a given amount has been exerted in tightening the fastener in order for the section to have sheared off. Second, that no more torque than was necessary for applying this fastener and shearing the section was applied.

There is thus provided a means for assuring a limited but predetermined torque value has been applied to a fastener in this manner.

It will also be observed that this fastener is set by a tool operating from only one side of the work. Particularly when working in restricted spaces where bucking bars, hand tools such as wrenches and screwdrivers, and other means for holding the pin against rotation cannot be got into the small spaces, the ability to set the fastener from one side is of considerable advantage. This does not, of course, preclude holding the pin from its other end or holding the pin from rotation in some other manner, besides that shown in the figures.

This invention is not to be limited by the embodiments shown in the drawings and described in the description, which are given by way of example and not of limitation, but only in accordance with the scope of the appended claims.

This application is a continuation-in-part of applicant's copending application Serial No. 661,874, filed May 27, 1957, now abandoned entitled "Fastener and Tool for Setting the Same," and is a continuation-in-part of applicant's copending application Serial No. 793,861, filed February 17, 1959, now abandoned entitled "Fastener," which is a division of applicant's application Serial No. 643,183, filed February 28, 1957, now United States Letters Patent 2,940,495, issued June 14, 1960, entitled "Lock Nut With Frangible Driving Portion."

I claim:

1. A fastener for exerting an assembling force on a workpiece member comprising, in combination, a pin having a longitudinal axis and exterior circumferential threads; a collar member comprising a tubular portion with an axis and an axial internally threaded pin-receiving hole therethrough, said collar member having a bearing section and a wrench-engaging section, a bearing surface on said bearing section lying substantially normal to the collar axis and surrounding said axis, wrench-engaging surfaces adjacent to the wrench-engaging section, and a circumferential groove located between said sections, said groove providing a reduced cross-section having the minimum shear strength of said collar whereby the wrench-engaging section will shear at a predetermined torque; and a substantially incompressible washer having a substantially flat side lying substantially normal to said bearing surface, said washer having a hole therethrough through which the pin can extend and support the washer between the collar member and the workpiece member, and a layer of a substantially dry lubricant on and adherent to said flat side, whereby when the threaded portion of the pin protrudes from the workpiece and the washer, the collar member can be threaded onto the pin and tightened down against the washer, the lubricant comprising a layer between the washer and the member against which the washer is held so that when the collar is turned by a force exerted on the wrench-engaging surfaces and is thereby rotated relative to the pin, exertion of torque causes the section of the collar member bearing the wrench-engaging surfaces to shear off, leaving the remainder of the collar member on the pin, the lubricant layer serving to maintain the coefficient of friction uniform between the lubricated side of the washer and the member in contact with said side, the lubricant layer being of substantially film thickness, and existing only on an exterior surface of the washer.

2. Apparatus according to claim 1 in which the lubricant is a polar compound.

3. Apparatus according to claim 1 in which the lubricant is a wax.

4. Apparatus according to claim 1 in which the lubricant is a polar wax.

5. A fastener for exerting an assembling force on a workpiece member comprising in combination: a pin having a shank and a longitudinal axis, exterior circumferential threads on said shank, and an exterior groove between a first end of the pin and at least some of said threads, the minimum external diameter of said groove being sufficiently small to permit shearing at the groove before shearing at any other part of the pin when counter-rotative torques are applied at opposite sides of the groove; a collar member comprising a tubular portion with an axis and an axial internally threaded pin-receiving hole therethrough, said collar having a bearing section with a bearing surface on said bearing section surrounding the axis; and a substantially incompressible washer having an exterior surface comprising a side of the washer and a hole therethrough intersecting said surface, and through which the pin can extend and support the washer, said washer being situated between the collar member and the workpiece member, and a layer of approximately film thickness of a substantially dry lubricant on and adherent to said side whereby with the first end of the pin, the threads and the groove located outside of the workpiece member and the collar member threaded onto the pin on the other side of the groove from said first end of the pin, the collar can be tightened down against the washer by applying counter-rotative torque to that portion of the pin between the groove and the first end, and to the collar, the layer of lubricant providing a lubricated surface between the washer and the member in contact with its said side, so that exertion of sufficient counter-rotative torque causes the pin to shear at the groove, the portion between the first end and the groove falling off, leaving the remainder of the pin attached to the collar, the lubricated layer serving to maintain the coefficient of friction uniform between the lubricated side of the washer and the member in contact with said side.

6. Apparatus according to claim 5 in which the bearing surface on the collar and the said surface on the washer are both flat surfaces which lie substantially normal to the pin axis when the fastener is assembled, and in which the lubricated layer faces the bearing surface on the collar.

7. Apparatus according to claim 6 in which the lubricant is a polar compound.

8. Apparatus according to claim 6 in which the lubricant is a wax.

9. Apparatus according to claim 6 in which the lubricant is a polar wax.

10. Apparatus according to claim 6 in which the washer is also provided with a second flat surface that is parallel to said first-named surface.

References Cited in the file of this patent

UNITED STATES PATENTS

| 1,449,683 | Lippold | Mar. 27, 1923 |
| 2,161,597 | Swartz | June 6, 1939 |
| 2,404,808 | Lowey | July 30, 1946 |
| 2,700,623 | Hall | Jan. 25, 1955 |
| 2,928,302 | Owen et al. | Mar. 15, 1960 |

FOREIGN PATENTS

| 706,332 | Great Britain | Mar. 31, 1954 |

OTHER REFERENCES

Metalworking Lubricants, by E. L. H. Bastain, McGraw-Hill Book Co., 1951 (pages 13 and 21).

UNITED STATES PATENT OFFICE
CERTIFICATE OF CORRECTION

Patent No. 3,138,987 June 30, 1964

George S. Wing

It is hereby certified that error appears in the above numbered patent requiring correction and that the said Letters Patent should read as corrected below.

Column 1, line 25, for "engages" read -- engaging --; column 3, line 70, for ".001" read -- .000.001 --; column 6, line 56, for "128" read -- 129 --; column 7, line 47, for "presse" read -- press --.

Signed and sealed this 4th day of May 1965.

(SEAL)
Attest:

ERNEST W. SWIDER
Attesting Officer

EDWARD J. BRENNER
Commissioner of Patents